United States Patent [19]

Sasaki et al.

[11] Patent Number: 4,994,523

[45] Date of Patent: Feb. 19, 1991

[54] IMPACT-RESISTANT RESIN COMPOSITION

[75] Inventors: Isao Sasaki; Naoki Yamamoto, both of Hiroshima; Akira Yanagase, Ohtake, all of Japan

[73] Assignee: Mitsubishi Rayon Company Limited, Tokyo, Japan

[21] Appl. No.: 299,677

[22] Filed: Jan. 23, 1989

[30] Foreign Application Priority Data

Jan. 25, 1988 [JP] Japan ................................. 63-14289

[51] Int. Cl.$^5$ ............................................. C08L 51/04
[52] U.S. Cl. ....................................... 525/63; 525/64; 525/479; 525/903
[58] Field of Search .................... 525/63, 479, 903, 64

[56] References Cited

U.S. PATENT DOCUMENTS

| | | |
|---|---|---|
| 2,891,920 | 6/1959 | Hyde et al. |
| 3,130,177 | 4/1964 | Grabowski |
| 3,294,725 | 12/1966 | Findlay et al. |
| 3,361,851 | 1/1968 | Gowan |
| 3,575,910 | 4/1971 | Thomas |
| 3,655,824 | 4/1972 | Kato et al. |
| 3,686,356 | 8/1972 | Saam .................... 525/63 |
| 3,864,428 | 2/1975 | Nakamura et al. |
| 3,878,263 | 4/1975 | Martin |
| 3,898,300 | 8/1975 | Hilliard |
| 3,923,923 | 12/1975 | Fledler .................... 525/63 |
| 3,954,905 | 5/1976 | Margotte et al. |
| 3,988,389 | 10/1976 | Margotte et al. |
| 4,013,613 | 8/1977 | Abolins et al. |
| 4,071,577 | 1/1978 | Falender et al. |
| 4,201,808 | 5/1980 | Cully et al. |
| 4,226,761 | 10/1980 | Cooper et al. |
| 4,277,595 | 7/1981 | Deichert et al. |
| 4,322,517 | 3/1982 | Deubzer et al. |
| 4,337,192 | 6/1982 | Campbell |
| 4,343,927 | 8/1982 | Chang |
| 4,443,581 | 4/1984 | Robeson et al. |
| 4,522,979 | 6/1985 | Chung et al. |
| 4,560,725 | 12/1985 | Van Bokhoven et al. |
| 4,594,387 | 6/1986 | Muramatsu et al. |
| 4,618,644 | 10/1986 | Liu .................... 524/535 |
| 4,661,546 | 4/1987 | Abu-Isa et al. |
| 4,690,986 | 9/1987 | Sasaki et al. .................... 525/479 |
| 4,877,831 | 10/1989 | Hongo et al. .................... 525/63 |

FOREIGN PATENT DOCUMENTS

| | | |
|---|---|---|
| 0080767 | 6/1983 | European Pat. Off. |
| 0231776 | 8/1987 | European Pat. Off. .................... 525/63 |
| 0246537 | 11/1987 | European Pat. Off. |
| 0260552 | 3/1988 | European Pat. Off. |
| 61-209247 | 9/1986 | Japan .................... 525/63 |
| 61-235462 | 10/1986 | Japan .................... 525/63 |
| 1430600 | 3/1976 | United Kingdom |
| 2003471 | 3/1979 | United Kingdom |
| 1590549 | 6/1981 | United Kingdom |

OTHER PUBLICATIONS

*Polymer Preprints,* vol. 28, Aug. 2, 1987, pp. 150-152.

*Primary Examiner*—John C. Bleutge
*Assistant Examiner*—Ralph Dean, Jr.
*Attorney, Agent, or Firm*—Cushman, Darby & Cushman

[57] ABSTRACT

An impact-resistant resin composition having excellent impact resistance, weather resistance, surface appearance and wear characteristics is disclosed.

The resin composition comprises:

(A) a compound rubber type graft copolymer wherein at least one vinyl monomers is graft-polymerized onto a compound rubber that has an average particle diameter of 0.08 to 0.6 μm and possesses such a structure that 10 to 90 wt. % of a polyorganosiloxane rubber component and 10 to 90 wt. % of a polyalkyl (meth)acrylate rubber component are entangled in an inseparable fashion, and the total amount of the polyorganosiloxane rubber component and the polyalkyl (meth)arcylate rubber component is 100 wt. %; and (B) a vinyl polymer obtained by polymerizing 70 to 100 wt. % of at least one vinyl monomer selected from the group consisting of aromatic alkenyl compounds, vinyl cyanide compounds, and alkyl (meth)acrylates with 0 to 30 wt. % of other vinyl monomer copolymerizable with them.

11 Claims, No Drawings

IMPACT-RESISTANT RESIN COMPOSITION

The present invention relates to an impact-resistant resin composition that can provide molded articles excellent in impact resistance, weather resistance, surface appearance, wear characteristics, moldability and fluidity.

The present invention is to provide a resin composition, which can provide molded articles remarkably improved in impact resistance, weather resistance, wear characteristics and surface appearance, and is excellent in moldability and fluidity, by blending a compound rubber type graft copolymer, which has been obtained by graft-polymerizing at least one vinyl monomer onto a compound rubber consisting of a polyorganosiloxane rubber component and a polyalkyl (meth)acrylate rubber component, with a vinyl polymer prepared from a major proportion of at least one vinyl monomer selected from the group consisting of aromatic alkenyl compounds, vinyl cyanide compounds, and (meth)acrylates.

An impact-resistant resin is generally made up of a rubber component and a matrix component, and it is said to be advantageous to use, for the rubber component, a resin having as low glass transition temperature as possible to absorb impact energy. This is evident from the fact that ABS resins which use, as a rubber, a polybutadiene resin having a glass transition temperature (hereinafter abbreviated as Tg) of −80° C. are more excellent in impact resistance than impact-resistant resins which use a polybutyl acrylate resin having a Tg of −55° C., at the same rubber content. Therefore, it is conceivable that if polydimethylsiloxanes having a Tg of −123° C. can be utilized as a rubber source for an impact-resistant resin, a resin more excellent in impact resistance than ABS resins can be obtained. However, polyorganosiloxanes are generally poor in reactiveness with vinyl monomers, and they have been difficult to form chemical bonds. Although several methods to form bonds between those components have been disclosed, those methods have not been satisfactory. For example, in U.S. Pat. No. 3,898,300, it is reported that when a vinyl monomer is polymerized in an emulsion of a polydimethylsiloxane polymer containing vinyl siloxane or allyl siloxane, a graft copolymer having an improved impact strength is prepared.

U.S. Pat. No. 4,071,577 has disclosed a method wherein a mercapto group-containing siloxane is used instead of a vinyl group-containing siloxane to further improve impact strength. That is, it is indicated in '577 Patent that because mercapto groups are contained in a polydimethylsiloxane/mercaptopropylsiloxane copolymer, the impact strength changed greatly and that the presence of the graft copolymer through mercapto groups improve the impact properties.

Further, Japanese Laid-Open Patent Application No. 252613/1985 has disclosed that a methacryloyloxy group-containing polyorganosiloxane type graft copolymer improves the impact resistance of resin compositions.

However, in these methods, molded articles obtained have imperfect surface appearance, and insufficient surface hardness and impact resistance due to defects of the silicone rubber structure.

Taking the above circumstances into consideration, the extensive researches have been conducted on chemical composition of graft copolymers that use a polyorganosiloxane rubber for improving impact resistance, surface appearance. As the results of the researches, it has been found that by blending a compound rubber type graft copolymer, which has been obtained by graft-polymerizing a vinyl monomer at a high ratio onto a compound rubber consisting of a polyorganosiloxane rubber component and a polyalkyl (meth)acrylate rubber component, with a vinyl polymer, a resin composition can be obtained which provides molded articles having a good compatibility of the graft copolymer and the vinyl polymer and excellent impact resistance, weather resistance, wear characteristics, surface appearance moldability and fluidity.

Therefore, the present invention is to provide an impact-resistant resin composition, which is obtained by blending: (A) a compound rubber type graft copolymer wherein at least one vinyl monomer is graft-polymerized onto a compound rubber that has an average particle diameter of 0.08 to 0.6 $\mu$m and possesses such a structure that 10 to 90 wt. % of a polyorganosiloxane rubber component and 10 to 90 wt. % of a polyalkyl (meth)acrylate rubber component are entangled in an inseparable fashion, and the total amount of the polyorganosiloxane rubber component and the polyalkyl (meth)acrylate rubber component is 100 wt. %; and (B) a vinyl polymer obtained by polymerizing 70 to 100 wt. % of at least one vinyl monomer selected from the group consisting of aromatic alkenyl compounds, vinyl cyanide compounds, and alkyl (meth)acrylates with 0 to 30 wt. % of other vinyl monomer copolymerizable with them.

The compound rubber type graft copolymer (A) used in the present invention refers to a copolymer wherein at least one vinyl monomer is graft-polymerized onto a compound rubber that has an average particle diameter of 0.08 to 0.6 $\mu$m and possesses such a structure that 10 to 90 wt. % of a polyorganosiloxane rubber component and 10 to 90 wt. % of a polyalkyl (meth)acrylate rubber component are entangled in an inseparable fashion, with the total amount of the polyorganosiloxane rubber component and the polyalkyl (meth)acrylate rubber component being 100 wt. %.

It is impossible to obtain the excellent properties of the resin composition of the present invention even if either the polyorganosiloxane rubber component or the polyalkyl (meth)acrylate rubber component, or a simple mixture of the two rubber components is used as the rubber source instead of the above-mentioned compound rubber. When the polyorganosiloxane rubber component and the polyalkyl (meth)acrylate rubber component are entangled to form a unitary composite, it is for the first time possible to obtain a resin composition that can provide molded articles having excellent impact resistance, weather resistance, friction characteristics, and surface appearance.

If the polyorganosiloxane rubber component constituting the compound rubber exceeds 90 wt. %, the surface appearance of a molded articles of the obtained resin composition becomes deteriorated, while if the polyalkyl (meth)acrylate rubber component exceeds 90 wt. %, the impact resistance of a molded article of the obtained resin composition becomes deteriorated. Therefore, each of the two rubber components constituting the compound rubber is required to be in the range of from 10 to 90 wt. % (provided that the total amount of the two rubber components is 100 wt. %), preferably in the range of 20 to 80 wt. %. The average particle diameter of said compound rubber is required to be in the range of from 0.08 to 0.6 μm. If the average particle diameter is less than 0.08 μm, the impact resistance of a molded article of the obtained resin composition becomes deteriorated, while if the average particle diameter exceeds 0.6 μm, the impact resistance of a molded article from the obtained resin composition becomes deteriorated, and also the surface appearance of the molded article becomes deteriorated. Emulsion polymerization is most suitable to obtain the compound rubber having such an average particle diameter. It is preferred that firstly a latex of the polyorganosiloxane rubber is prepared, and then the rubber particles of the polyorganosiloxane rubber latex are impregnated with an alkyl (meth)acrylate and the alkyl (meth)acrylate is subjected to polymerization.

The polyorganosiloxane rubber constituting the above compound rubber may be prepared by emulsion polymerization using an organosiloxane and a crosslinking agent (I) as described hereinafter. At that time, a graftlinking agent (II) may be used additionally.

Examples of the organosiloxane include various types of cyclic siloxanes of at least three-membered ring, preferably from 3- to 6-membered cyclosiloxanes. For example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane can be mentioned, which may be used alone or in combination as a mixture of two or more different types. The organosiloxane is used in an amount of 50 wt. % or over, preferably 70 wt. % or over, of the polyorganosiloxane rubber component.

As the crosslinking agent (I), can be used a trifunctional or tetrafunctional silane type crosslinking agent, such as trimethoxymethylsilane, triethoxyphenylsilane, tetramethoxysilane, tetraethoxysilane, tetra-n-propoxysilane, and tetrabutoxysilane. Particularly, tetrafunctional crosslinking agents are preferable, and of these, tetraethoxysilane is especially preferable. The crosslinking agent is used in an amount of 0.1 to 30 wt. % of the polyorganosiloxane rubber component.

As the grafting agent (II), can be used, for example, a compound capable of forming a unit represented by the formula:

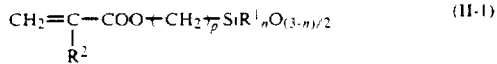  (II-1)

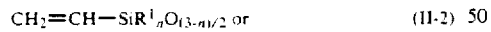  (II-2)

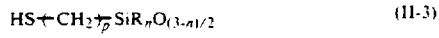  (II-3)

wherein $R^1$ is a methyl group, an ethyl group, a propyl group, or a phenyl group, $R^2$ is a hydrogen atom, or a methyl group, n is 0, 1, or 2, and p is a number of 1 to 6. A (meth)acryloyloxysiloxane capable of forming the unit of the formula (II-1) has a high graft efficiency and thus is capable of forming effective graft chains, and it is advantageous from the viewpoint of providing impact resistance. A methacryloyloxysiloxane is particularly preferable as the compound capable of forming the unit of the formula (II-1). Specific examples of the methacryloyloxysiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyoxybutyldiethoxymethylsilane. The grafting agent is used in an amount of 0 to 10 wt. % of the polyorganosiloxane rubber component.

The latex of this polyorganosiloxane rubber component may be produced by a process disclosed, for example, in U.S. Pat. Nos. 2,891,290, and 3,294,725. In the present invention, such a latex is preferably produced, for example, in such a manner that a solution mixture of the organosiloxane, the crosslinking agent (I), and, if desired, the grafting agent (II) are subjected to shear-mixing with water by means of e.g. a homogenizer in the presence of a sulfonic acid type emulsifier such as an alkylbenzenesulfonic acid and an alkylsulfonic acid. An alkylbenzenesulfonic acid is preferable since it serves not only as an emulsifier for the organosiloxane but also as a polymerization initiator. Further it is preferable to combine a metal salt of an alkylbenzenesulfonic acid, or a metal salt of an alkylsulfonic acid, since such combined use is effective for maintaining the polymer under a stabilized condition during the graft polymerization.

Next, the polyalkyl (meth)acrylate rubber component constituting the compound rubber may preferably be prepared by using an alkyl (meth)acrylate, a crosslinking agent (III) and a graftlinking agent (IV) as described hereinafter.

Examples of the alkyl (meth)acrylate include alkyl acrylates such as methyl acrylate, ethyl acrylate, n-propyl acrylate, n-butyl acrylate, and 2-ethylhexyl acrylate, and alkyl methacrylates such as hexyl methacrylate, 2-ethylhexyl methacrylate, and n-lauryl methacrylate, with n-butyl acrylate preferably used.

Examples of the crosslinking agent (IV) include ethylene glycol dimethacrylate, propylene glycol dimethacrylate, 1,3-butylene glycol dimethacrylate, and 1,4-butylene glycol dimethacrylate.

Examples of the grafting agent (IV) include allyl methacrylate, triallyl cyanurate and triallyl isocyanurate. Allyl methacrylate can be used also as a crosslinking agent.

These crosslinking agents and grafting agents may be used alone or in combination as a mixture of two or more different types. The total amount of such crosslinking agent and graftlinking agent is 0.1 to 20 wt. % of the polyalkyl (meth)acrylate rubber component.

The polymerization for preparing the polyalkyl (meth)acrylate rubber component is conducted by adding a monomer mixture of the alkyl (meth)acrylate, the crosslinking agent and the graftlinking agent into the latex of the polyorganosiloxane rubber component neutralized by the addition of an aqueous solution of an alkali such as sodium hydroxide, potassium hydroxide, or sodium carbonate to have the polyorganosiloxane rubber particles impregnated with the monomer mixture, followed by addition of a usual radical polymerization initiator and heating them to polymerize. As the polymerization progresses, a cross-linked network of a polyalkyl (meth)acrylate rubber entangled with the cross-linked network of the polyorganosiloxane rubber will be formed to obtain a latex of a compound rubber wherein the polyorganosiloxane rubber component and the polyalkyl (meth)acrylate rubber component are entangled in an inseparable manner. In carrying out the present invention, as the compound rubber, it is preferable to use a compound rubber wherein the main skeleton of the polyorganosiloxane rubber component has repeating units of dimethylsiloxane, and the main skeleton of the polyalkyl (meth)acrylate rubber component has repeating units of n-butyl acrylate.

The compound rubber thus prepared by emulsion polymerization is graft-copolymerizable with a vinyl monomer. Further, the polyorganosiloxane rubber component and the polyalkyl (meth)acrylate rubber component are firmly entangled, so that they cannot be separated by extraction with a usual organic solvent such as acetone or toluene. The gel content of the compound rubber measured by extraction with toluene at 90° C. for 12 hours is at least 80 wt. %.

The vinyl monomer to be graft-polymerized onto this compound rubber may be various vinyl monomers including an aromatic alkenyl compound such as styrene, α-methylstyrene, or vinyltoluene; a methacrylate such as methyl methacrylate or 2-ethylhexyl methacrylate; an acrylate such as methyl acrylate, ethyl acrylate, or butyl acrylate; and a vinyl cyanide compound such as acrylonitrile, methacrylonitrile, or N-phenylmaleimide. These vinyl monomers may be used alone or in combination as a mixture of two or more different types.

The proportions of the compound rubber and the vinyl monomer in the compound rubber type graft copolymer (A) are preferably such that the compound rubber is 30 to 95 wt. %, preferably 40 to 90 wt. %, and the vinyl monomer is 5 to 70 wt. %, preferably 10 to 60 wt. %, based on the weight of the graft copolymer (A). If the vinyl monomer is less than 5 wt. %, the dispersion of the graft copolymer (A) in the resin composition is not enough, while if it exceeds 70 wt. %, the effect for the improvement of the impact strength lowers.

The vinyl monomer is added to a latex of the compound rubber and then polymerized in a single step or in multi-steps by a radical polymerization technique to obtain a latex of the compound rubber type graft copolymer (A). The latex thus obtained is poured into hot water in which a metal salt such as calcium chloride or magnesium sulfate is dissolved, followed by salting out and coagulation to separate and recover the compound rubber type graft copolymer (A).

The vinyl polymer (B) used in the present invention is a homopolymer or a copolymer of 70 to 100 wt. % of at least one vinyl monomer selected from the group consisting of aromatic alkenyl compounds, vinyl cyanide compounds, and (meth)acrylates with 0 to 30 wt. % of other vinyl monomer copolymerizable with them. Examples of the aromatic alkenyl compound include styrene, α-methylstyrene, and vinyltoluene, examples of the vinyl cyanide compound include acrylonitrile, and methacrylonitrile, examples of the acrylate include methyl acrylate, ethyl acrylate, and butyl acrylate, and examples of the methacrylate include methyl methacrylate, and 2-ethylhexyl methacrylate, which may be used alone or in combination as a mixture of two or more types. The copolymerizable other vinyl monomer is used if desired, and the amount of the other vinyl monomer to be used is up to 30 wt. % of the vinyl polymer (B). Examples of the copolymerizable other vinyl monomer include ethylene, and vinyl acetate. In carrying out the present invention, the vinyl polymers (B) may be used alone or in combination as a mixture of two or more types. There is no limitation on the process of the production of the vinyl polymer (B), and the vinyl polymer (B) can be obtained, for example, by an emulsion polymerization process, a suspension polymerization process, or a mass polymerization process.

The vinyl polymer (B) is blended for the purpose of improving moldability, etc., and the amount of the vinyl polymer (B) to be blended is preferably in the range of 5 to 85 wt. % based on the weight of all the resin composition.

The resin composition of the present invention may further contain, if necessary, a stabilizer, a plasticizer, a lubricant, a flame retardant, a pigment, a filler, etc.

EXAMPLES

Now, the present invention will be described in further detail with reference to Examples. However, it should be understood that the present invention is by no means restricted by such specific Examples. In these Examples, "parts" means "parts by weight".

The physical properties in Examples and Comparative Examples were measured as follows:

Izod impact strength: Izod impact strength was measured according to ASTM D 256 using a notched test piece of ¼ thickness.

Vicat softening temperature: Vicat softening temperature was measured according to ISO R 306.

Gloss: Gloss was measured according to ASTM D 523-62T (60° specular glossiness).

Dynstat strength retention ratio: Dynstat strength retention ratio was measured according to DIN 53435.

Assuming the Dynstat strength of the test piece before the exposure to a sunshine weatherometer to be 100% the ratio of the Dynstat strength of the test piece after the exposure to the sunshine weatherometer to the Dynstat strength of the test piece before the exposure was assigned to be the retention ratio.

REFERENCE EXAMPLE 1

Production of a compound rubber type graft copolymer (S-1)

Two parts of tetraethoxysilane, 0.5 parts of γ-methacryloyloxypropyldimethoxymethylsilane, and 97.5 parts of octamethylcyclotetrasiloxane were mixed to obtain 100 parts of a siloxane mixture. Then, 100 parts of the siloxane mixture were added to 200 parts of distilled water having 1 part of sodium dodecylbenzene sulfonate and 1 part of dodecylbenzene sulfonic acid dissolved therein. The mixture was preliminarily stirred at 10,000 rpm by a homomixer and then emulsified and dispersed by a homogenizer under a pressure of 300 kg/cm$^2$ to obtain an organosiloxane latex. This mixture was transferred to a separable flask equipped with a condenser and a stirrer, and it was heated at 80° C. for 5 hours under stirring, and then left at 20° C. for 48 hours. Then, this latex was neutralized to pH 7.5 with an aqueous sodium hydroxide solution to stop the polymerization to obtain a polyorganosiloxane rubber latex 1. The ratio of polymerization of the organosiloxane was 88.5%, and the average particle diameter of the polyorganosiloxane rubber was 0.16 μm.

Then, 119 parts of the polyorganosiloxane rubber latex 1 were introduced into a separable flask equipped with a stirrer, and 57.5 parts of distilled water were added thereto. After flushing with nitrogen, the mixture was heated to 50° C., and a mixed solution comprising 33.95 parts of n-butyl acrylate, 1.05 parts of allyl methacrylate, and 0.26 parts of tert-butyl hydroperoxide was charged, and the mixture was stirred for 30 min to impregnate the mixed solution into the polyorganosiloxane rubber particles. Then, a mixed solution comprising 0.002 parts of ferrous sulfate, 0.006 parts of disodium ethylenediaminetetraacetate, 0.26 parts of Rongalit and 5 parts of distilled water was charged thereto to initiate radical polymerization, and the internal temperature was maintained at 70° C. for 2 hours to complete the polymerization reaction to obtain a compound rubber latex. A part of this latex was sampled, and the average particle diameter was measured to find to be 0.19 μm. This latex was dried to obtain a solid product, which was extracted with toluene at 90° C. for 12 hours, whereby the gel content was measured to find to be 97.3 wt. %. To this compound rubber latex, a mixed solution comprising 0.12 parts of tert-butyl hydroperoxide, 22.5 parts of styrene, and 7.5 parts of acrylonitrile was added dropwise at 70° C. over a period of 15 min, and the mixture was maintained at 70° C. for 4 hours to complete the graft polymerization of the styrene and acrylonitrile to the compound rubber. The ratio of polymerization of the styrene was 98.4%, and the ratio of polymerization of the acrylonitrile was 97.2%. The graft copolymer latex thus obtained was added dropwise to 200 parts of hot water containing 1.5 wt. % of calcium chloride and coagulated, and the coagulated product was separated, washed and dried at 75° C. for 16 hours to obtain 98.1 parts of a compound rubber type graft copolymer (hereinafter referred to as S-1) as a dry powder.

REFERENCE EXAMPLE 2

Production of a compound rubber type graft copolymer (S-2)

Two parts of tetraethoxysilane, and 98 parts of octamethylcyclotetrasiloxane were mixed to obtain 100 parts of a mixed siloxane. Then, 100 parts of the mixed siloxane were added to 200 parts of distilled water having 1 part of sodium dodecylbenzene sulfonate and 1 part of dodecylbenzene sulfonic acid dissolved therein. The mixture was preliminarily dispersed by a homomixer and then emulsified and dispersed by a homogenizer in the same way as for the production of graft copolymer S-1. The dispersed product was then heated to 80° C. for 5 hours, cooled, allowed to stand for 48 hours at 20° C., and finally neutralized to a pH of 7.5 with an aqueous sodium hydroxide solution to stop the polymerization thereby obtaining a polyorganosiloxane rubber latex 2. The ratio of polymerization of the organosiloxane was 88.9%, and the average particle diameter of the polyorganosiloxane was 0.16 μm.

Then, 117 parts of the polyorganosiloxane rubber latex 2 were introduced into a separable flask equipped with condenser and a stirrer, and 57.5 parts of distilled water were added thereto. After flushing with nitrogen, the mixture was heated to 50° C., and a mixed solution comprising 33.95 parts of n-butyl acrylate, 1.05 parts of allyl methacrylate, and 0.26 parts of tert-butyl hydroperoxide was charged and the mixture was stirred for 30 min. Polymerization of the n-butyl acrylate and allyl methacrylate was carried out in the same way and under the same conditions as for the production of graft copolymer S-1 to obtain a compound rubber latex. The average particle diameter of the compound rubber was 0.20 μm, and the gel content of the rubber measured by the toluene extraction method in the same way as in Reference Example 1 was 92.4 wt. %. A mixture of 22.5 parts of styrene, 7.5 parts of acrylonitrile, and 0.12 parts of tert-butyl hydroperoxide was added to the compound rubber latex thus obtained, and the graft polymerization of the styrene and acrylonitrile was carried out under the same conditions as for graft copolymer S-1. The graft copolymer latex thus obtained was coagulated, and the coagulated product was separated, washed and dried in the same way as in Reference Example 1 to obtain 97.6 parts of a dry powder of a compound rubber type graft copolymer (hereinafter referred to as S-2).

REFERENCE EXAMPLE 3

Production of compound rubber type graft copolymers (S-3 to S-6)

The polyorganosiloxane rubber latex 1 prepared in the production of the compound rubber type graft copolymer S-1 was used to produce compound rubber type graft copolymers under the same conditions as in Reference Example 1 except that such amounts of distilled water, n-butyl acrylate and allyl methacrylate as shown in Table 1 below were used to form butyl acrylate rubber component.

TABLE 1

| Component | Compound rubber latex | | | |
|---|---|---|---|---|
| | 3 | 4 | 5 | 6 |
| Polyorganosiloxane rubber latex 1 (parts) | 17.0 | 67.8 | 169.5 | 220.4 |
| Distilled water (parts) | 150 | 150 | 0 | 0 |
| Butyl acrylate (parts) | 63.1 | 48.5 | 19.7 | 4.9 |
| Allyl methacrylate (parts) | 2 | 1.5 | 0.3 | 0.1 |
| Tert-Butyl hydroperoxide (parts) | 0.26 | 0.26 | 0.08 | 0.02 |
| Average particle diameter of compound rubber (μm) | 0.30 | 0.23 | 0.16 | 0.14 |
| Gel content of compound rubber (wt. %) | 96.3 | 94.5 | 90.4 | 93.2 |

A mixture of 22.5 parts of styrene, 7.5 parts of acrylonitrile, and 0.12 parts of the tert-butyl hydroperoxide was added to each of the compound rubber latices, then the graft polymerization of the styrene and acrylonitrile onto the compound rubber was carried out under the same conditions as in Reference Example 1 mentioned above, and after the completion of the polymerization reaction each of the latices thus obtained was coagulated, and the coagulated product was separated, and dried in the same way as in Reference Example 1 to obtain dry powders of compound rubber type graft copolymers (hereinafter referred to as S-3 to S-6 respectively).

REFERENCE EXAMPLE 4

Production of compound rubber type graft copolymers (S-7 and S-8)

Using the polyorganosiloxane rubber latex 1 prepared when the compound rubber type graft copolymer S-1 was produced, two types of compound rubber type graft copolymers were prepared that were different in the amount of the acrylonitrile and styrene monomers.

That is, 119 parts of the polyorganosiloxane rubber latex 1 were introduced together with 200 parts of distilled water into a separable flask equipped with a stirrer. After flushing with nitrogen, the mixture was heated to 50° C., a mixed solution comprising 33.95 parts of n-butyl acrylate, 1.05 parts of allyl methacrylate, and 0.26 parts of tert-butyl hydroperoxide was charged, the mixture was stirred for 30 min, and then, a mixed solution comprising 0.002 parts of ferrous sulfate, 0.006 parts of disodium ethylenediaminetetraacetate, 0.26 parts of Rongalit and 5 parts of distilled water was charged thereto to initiate polymerization thereby preparing a compound rubber latex. The average particle diameter of the compound rubber was 0.19 μm, and the gel content of the rubber measured by the toluene extraction method in the same way as in Reference Example 1 was 97.3 wt. %. To this compound rubber latex, a mixed solution comprising 37.5 parts of styrene, 12.5 parts of acrylonitrile, and 0.2 parts of tert-butyl hydroperoxide was added dropwise at 70° C. over a period of 15 min, and the mixture was maintained at 70° C. for 4 hours to complete the graft polymerization of the styrene and acrylonitrile. Thereafter, the coagulation, separation, and drying were carried out in the same manner as in Reference Example 1 to prepare a dry powder of a compound rubber type graft copolymer (hereinafter referred to as S-7).

Graft polymerization was carried out in the same manner as for S-7, except that a mixed solution comprising 7.5 parts of styrene, 2.5 parts of acrylonitrile, and 0.04 parts of tert-butyl hydroperoxide was added to the compound rubber latex. Thereafter, the coagulation, separation and drying were carried out in the same manner as in Reference Example 1 to prepare a dry powder of a compound rubber type graft copolymer (hereinafter referred to as S-8).

REFERENCE EXAMPLE 5

Production of a graft copolymer (S-9)

119 parts of the polyorganosiloxane rubber latex 1 were introduced together with 57.5 parts of distilled water into a separable flask equipped with a stirrer. After flushing with nitrogen, the mixture was heated to 50° C., and a mixed solution comprising 33.95 parts of n-butyl acrylate, and 0.26 parts of tert-butyl hydroperoxide was added thereto, followed by stirring for 30 min. Thereafter, the same polymerization initiator in the same amount as used in Reference Example 1 was charged to effect the emulsion polymerization to prepare a rubber latex. This case was different from Reference Example 1 in that allyl methacrylate was not added. The average particle diameter of the polymer of this rubber latex and the gel content of the rubber measured by the toluene extraction method were 0.22 μm, and 63 wt. %, respectively. To this compound rubber latex, a mixed solution comprising 22.5 parts of styrene, 7.5 parts of acrylonitrile, and 0.12 parts of tert-butyl hydroperoxide was added dropwise at 70° C. over a period of 15 min, and the mixture was maintained at 70° C. for 4 hours to complete the graft polymerization. After the completion of the polymerization reaction, the coagulation, separation, and drying were carried out in the same manner as in Reference Example 1 to prepare a dry powder of a compound rubber type graft copolymer (hereinafter referred to as S-9).

REFERENCE EXAMPLE 6

Production of a graft copolymer (S-10)

119 parts of the polyorganosiloxane rubber latex 1 were introduced together with 57.5 parts of distilled water into a separable flask equipped with a stirrer. After flushing with nitrogen, a mixed solution comprising 35 parts of n-butyl acrylate, 22.5 parts of styrene, 7.5 parts of acrylonitrile, and 0.26 parts of tert-butyl hydroperoxide was added dropwise thereto at 70° C. over 30 min in the presence of the same amount of the same polymerization initiator as used in Reference Example 1. Thereafter, the temperature was maintained at 70° C. for 4 hours to complete the polymerization reaction, and then, the coagulation, separation, and drying were carried out in the same manner as in Reference Example 1 to prepare a dry powder of a graft copolymer (hereinafter referred to as S-10).

REFERENCE EXAMPLE 7

Production of a compound rubber type graft copolymer (S-11)

Two parts of tetraethoxysilane, 0.5 parts of γ-methacrylolyloxypropyldimethoxymethylsilane and 97.5 parts of octamethylcyclotetrasiloxane were mixed to obtain 100 parts of a mixed siloxane. Then, 100 parts of the mixed siloxane were added to 200 parts of distilled water having 4 parts of dodecylbenzene sulfonic acid and 2 parts of sodium dodecylbenzene sulfonate dissolved therein. The mixture was preliminarily dispersed by a homomixer and then emulsified and dispersed by a homogenizer in the same way as for the production of graft copolymer S-1. The dispersed product was then heated to 80° C. for 5 hours, cooled, allowed to stand for 48 hours at 20° C., and finally neutralized to a pH of 7.0 with an aqueous sodium hydroxide solution to stop the polymerization thereby obtaining a polyorganosiloxane rubber latex 3. The ratio of polymerization of the organosiloxane was 89.6%, and the average particle diameter of the polyorganosiloxane was 0.05 μm.

117 parts of the polyorganosiloxane rubber latex 3 were weighed, and 57.5 parts of distilled water were added thereto. Then a mixed solution comprising 33.95 parts of n-butyl acrylate, 1.05 parts of allyl methacrylate, and 0.26 parts of tert-butyl hydroperoxide was charged, and the polymerization was carried out under the same conditions as for the production of graft copolymer S-1 to obtain a compound rubber. The average particle diameter of the compound rubber was 0.07 μm, and the gel content of the rubber measured by the toluene extraction method in the same way as in Reference Example 1 was 95.8 wt. %. A mixture of 22.5 parts of styrene, 7.5 parts of acrylonitrile, and 0.12 parts of tert-butyl hydroperoxide was added to the compound rubber latex thus obtained, and the graft polymerization was carried out under the same conditions and in the same way as for graft copolymer S-1. The graft copolymer latex thus obtained was coagulated, and the coagulated product was separated and dried in the same way as in Reference Example 1 to obtain a dry powder of a compound rubber type graft copolymer (hereinafter referred to as S-11).

REFERENCE EXAMPLE 8

Production of compound rubber type graft copolymers (S-12 and S-13)

211.5 parts of a compound rubber latex prepared in Reference Example 1 were introduced into a separable flask equipped with a condenser and a stirrer. After flushing with nitrogen, the temperature was elevated to 60° C., then a mixed solution comprising 0.24 parts of tert-butyl hydroperoxide, and 30 parts of styrene were added dropwise over 1 hour, and then the reaction temperature was maintained at 60° C. for 2 hours to complete the polymerization reaction. After the completion of the polymerization reaction, the graft copolymer latex was coagulated, and the coagulated product was separated and dried in the same way as in Reference Example 1 to obtain a dry powder of a compound rubber type graft copolymer (hereinafter referred to as S-12).

Similarly, 211.5 parts of a compound rubber latex prepared in Reference Example 1 were introduced into the flask. After flushing with nitrogen, the temperature was elevated to 60° C., then a mixed solution comprising 0.24 parts of tert-butyl hydroperoxide, and 30 parts of methyl methacrylate were added dropwise over 1 hour, and then the reaction temperature was maintained at 60° C. for 2 hours to complete the polymerization reaction. After the completion of the polymerization reaction, the graft copolymer latex was coagulated, and the coagulated product was separated and dried in the same way as in Reference Example 1 to obtain a dry powder of a compound rubber type graft copolymer (hereinafter referred to as S-13).

EXAMPLES 1 to 4 and COMPARATIVE EXAMPLES 1 to 5

25 wt. % of each of graft copolymers S-1 to S-6, S-9, S-10, and S-11 prepared in Reference Examples 1 to 3, and 5 to 7 and 75 wt. % of an acrylonitrile/styrene copolymer in which the acrylonitrile content was 27 wt. % and the reduced viscosity ($\eta sp/C$) of the copolymer measured in chloroform at 25° C. was 0.59 dl/g were blended to prepare 9 types of resin compositions (Examples 1 to 4 and Comparative Examples 1 to 5).

Each of these 9 resin compositions was supplied to an extruder, then melted and kneaded at a cylinder temperature of 230° C., and shaped into pellets. After the pellets of each of the resin compositions were dried, they are supplied to an injection molder (Promat 165/75 manufactured by Sumitomo Heavy Industries, Ltd.), and were injection molded at a cylinder temperature of 230° C., and a mold temperature of 60° C. to obtain test pieces of the resin compositions. These test pieces were used to assess physical properties, and the results are shown in Table 2.

TABLE 2

| | Graft copolymer used | Izod impact strength ($\frac{1}{4}''$ notch; 23° C.) (kg · cm/cm) | Gloss (%) |
|---|---|---|---|
| Example 1 | S-1 | 19.4 | 95.0 |
| Example 2 | S-2 | 18.1 | 94.3 |
| Example 3 | S-4 | 14.6 | 93.2 |
| Example 4 | S-5 | 20.2 | 90.2 |
| Comparative Example 1 | S-3 | 5.5 | 84.6 |
| Comparative Example 2 | S-6 | 15.2 | 81.2 |
| Comparative Example 3 | S-9 | 6.5 | 63.2 |
| Comparative Example 4 | S-10 | 3.8 | 54.5 |
| Comparative Example 5 | S-11 | 5.2 | 91.6 |

It will be apparent first from the results of the experiments of Examples 1 to 4, and Comparative Examples 1 and 2 that unless a content of the polyorganosiloxane rubber component in the compound rubber is in a range from 10 to 90 wt. %, a resin composition of excellent properties could not be obtained.

Then, it is understood that when the powder of the graft copolymer S-9 that did not contain a crosslinking agent in the polybutyl acrylate rubber component was used as the graft copolymer (Comparative Example 3), the impact resistance and the surface gloss of the molded article were poor. This is because the gel content of the rubber component is low and a compound rubber was not formed.

Further, as shown by Comparative Example 4 that used the powder of the graft copolymer S-10, when a polymer wherein n-butyl acrylate, styrene, and acrylonitrile were simply graft-polymerized onto a polyorganosiloxane rubber was used, improvement in impact resistance and surface gloss of a molded article could not been attained This will be due to the fact that a compound rubber was not formed in the graft copolymer S-10 and a compatibility of a grafted resinous component of the graft copolymer with an acrylonitrile/styrene copolymer was not good.

Further, it was found that when the compound rubber type graft copolymer S-11 having a small polyorganosiloxane rubber particle diameter had been used (Comparative Example 5), the impact resistance of the molded article had been low.

EXAMPLES 5 and 6

25 wt. % of each of the compound rubber type graft copolymers S-7 and S-8 prepared in Reference Example 4 and 75 wt. % of the acrylonitrile/styrene copolymer used in Example 1 were blended.

From these two resin compositions, test pieces were prepared by using the extruder and the injection molder used in Example 1 under the same conditions as in Example 1, and the physical properties were measured. The results are shown in Table 3.

From the results shown in Table 3, it can be understood that even if the amount of grafting monomers onto the compound rubber was changed a little, the impact resistance and the glossiness of the molded articles were fairly excellent.

TABLE 3

| | Graft copolymer used | Izod impact strength ($\frac{1}{4}''$ notch; 23° C.) (kg · cm/cm) | Gloss (%) |
|---|---|---|---|
| Example 5 | S-7 | 16.2 | 95.8 |
| Example 6 | S-8 | 20.5 | 93.4 |

COMPARATIVE EXAMPLE 6

Using a graft copolymer prepared by graft polymerization of styrene and acrylonitrile onto a polybutyl acrylate rubber, improvement of impact resistant was attempted.

That is, a mixed solution comprising 58.8 parts of n-butyl acrylate, 1.8 parts of allyl methacrylate, and 0.1 parts of tert-butyl hydroperoxide was emulsified in the flask into 120 parts of distilled water having 2 parts of sodium dodecylbenzenesulfonate dissolved therein. After flushing with nitrogen, the temperature was elevated to 60° C., and the same polymerization initiator as in Reference Example 1 was added thereto to initiate the polymerization. After the completion of the polymerization of butyl acrylate and allyl methacrylate, a mixed solution comprising 30 parts of styrene, 10 parts of acrylonitrile, and 0.1 parts of tert-butyl hydroperoxide was added dropwise to effect graft polymerization. After the completion of the polymerization, the coagulation, washing and drying were effected under the same conditions as in Reference Example 1 to obtain a graft copolymer.

30 parts of this graft polymer and 70 parts of the acrylonitrile/styrene copolymer used in Example 1 were mixed, the mixture was melted and shaped to prepare test pieces in the same way as in Example 1. The properties of the test piece were measured to find out that the Izod impact strength was 3.6 kg.cm/cm that was a poor level. From the results of this Comparative Example and Comparative Examples 1 and 2 as well as other Examples, it can be understood that when a polyorganosiloxane and a polybutyl acrylate were compounded, the impact strength and the surface gloss had become excellent.

EXAMPLE 7

The test pieces prepared in Example 1 and test pieces prepared using a commercially available ABS resin (Diapet® 3001 manufactured by Mitsubishi Rayon Co., Ltd.) in the same way as in Example 1 were exposed by using a sunshine weatherometer, and the retention ratio of the Dynstat strength and the retention ratio of the gloss were measured. The results were shown in Table 4.

TABLE 4

| Exposure time by sunshine weatherometer (hr) | Resin composition of Example 1 | | ABS resin | |
|---|---|---|---|---|
| | Dynstat strength retention ratio (%) | Gloss retention ratio (%) | Dynstat strength retention ratio (%) | Gloss retention ratio (%) |
| 0 | 100 | 100 | 100 | 100 |
| 200 | 91 | 86 | 20 | 48 |
| 400 | 86 | 73 | 16 | 13 |
| 600 | 82 | 65 | 14 | 8 |
| 1000 | 75 | 58 | 14 | 3 |

From the results shown in Table 4, it can be understood that the resin composition of the present invention were excellent in weather resistance and surface gloss retention property.

EXAMPLE 8

25 parts of the compound rubber type graft copolymer S-12 prepared in Reference Example 8 and 75 parts of a polystyrene having a melt index value of 8 gr/10 min at 200° C. under a load of 5 kg were mixed, melted, and shaped to prepare test pieces in the same way as in Example 1, and when the properties were assessed, the Izod impact strength was 14.3 kg.cm/cm, which was an excellent level.

EXAMPLE 9

30 parts of the compound rubber type graft copolymer S-13 prepared in Reference Example 8 and 70 parts of a polymethyl methacrylate having a melt index value of 7.8 gr/10 min at 230° C. under a load of 10 kg were mixed, melted, and shaped to prepare test pieces in the same way as in Example 1, and when the Izod impact strength was measured, it was 8.5 kg.cm/cm, which was an excellent level.

EXAMPLE 10

The test pieces prepared in Example 1 and the test pieces prepared by using a commercially available ABS resin (Diapet® 1001 manufactured by Mitsubishi Rayon Co., Ltd.) in the same way as in Example 1 were compared by a friction/wear test. The measurement was carried out by using a Toyo Baldwin EFM-III-E friction/wear testing machine, with the test piece whose rotation side and fixed side being the same resin finished with a sand paper No. 1500. The results of the measurement are shown in Table 5.

TABLE 5

| Material | Coefficient of dynamic friction | Specific worn amount 10 mg/kg·mm | | Conditions of measurement | |
|---|---|---|---|---|---|
| | | Rotation side | Fixed side | Sliding speed | Load |
| Test piece of Example 1 | 0.18 | 2.4 | 2.1 | 30 mm/sec | 2.4 kg |
| Test piece of Diapet® 1001 | 0.40 | 4.5 | 11 | 30 mm/sec | 2.4 kg |
| Test piece of Example 1 | 0.19 | 3.6 | 3.1 | 30 mm/sec | 5.0 kg |
| Test piece of Diapet® 1001 | 0.42 | 58 | 34 | 30 mm/sec | 5.0 kg |

From the results shown in Table 5, it can be understood that the test piece prepared from the resin composition of the present invention had more excellent friction/wear property than that of the test piece of the commercially available ABS resin, and was low in coefficient of dynamic friction and specific worn amount.

EXAMPLES 11 and 12

30 wt. % of the compound rubber type graft copolymer S-1 obtained in Reference Example 1, and 70 wt. % of an acrylonitrile/α-methylstyrene copolymer prepared using monomer mixture comprising acrylonitrile/α-methylstyrene = 30/70 (wt. %) by emulsion polymerization were blended, and 30 wt. % of the compound rubber type graft copolymer S-2 obtained in Reference Example 2, and 70 wt. % of an acrylonitrile/α-methylstyrene copolymer prepared using a monomer mixture comprising acrylonitrile/α-methylstyrene = 30/70 (wt. %) by emulsion polymerization were blended in order to prepare two resin compositions. The two types of the resin compositions were melted and shaped into two types of pellets. From these two types of pellets, test pieces were prepared in the same way as in Example 1. Using the test pieces, the physical properties were measured. The results are shown in Table 6.

TABLE 6

| | Graft copolymer used | Izod impact strength (¼" notch; 23° C.) (kg·cm/cm) | Vicat softening temperature (°C.) |
|---|---|---|---|
| Example 11 | S-1 | 17.3 | 116 |
| Example 12 | S-2 | 16.5 | 115 |

As apparent from the results shown in Table 6, it was found when a vinyl polymer containing α-methyl styrene was blended with the graft copolymer of the present invention, a resin composition having high heat resistance and impact resistant is obtained. In the case of the test piece of the resin composition, the Vicat softening temperature was 100° C.

We claim:
1. An impact-resistant resin composition comprising:
(A) a compound rubber type graft copolymer wherein at least one vinyl monomer is graft-polymerized onto a compound rubber that has an average particle diameter of 0.08 to 0.6 μm and possesses such a structure that 10 to 90 wt. % of a polyorganosiloxane rubber component and 10 to 90 wt. % of a polyalkyl (meth)acrylate rubber component are entangled in an inseparable fashion, and the total amount of the polyorganosiloxane rubber component and the polyalkyl (meth)acrylate rubber component is 100 wt. %; and (B) a vinyl polymer obtained by polymerizing 70 to 100 wt. % of at least one vinyl monomer selected from the group consisting of aromatic alkenyl compounds, vinyl cyanide compounds, and alkyl (meth)acrylates with 0 to 30 wt. % of another vinyl monomer.

2. An impact-resistant resin composition according to claim 1, wherein said compound rubber comprises a polyorganosiloxane rubber component obtained by emulsion polymerization of an organosiloxane, and a crosslinking agent, and a polyalkyl (meth)acrylate rubber component obtained by polymerizing a monomer mixture of an alkyl (meth)acrylate, a crosslinking agent and a graftlinking agent after having the polyorganosiloxane rubber component impregnated with the monomer mixture.

3. An impact-resistant resin composition according to claim 1, wherein the main skeleton of the polyorganosiloxane rubber component has repeating units of dimethylsiloxane, and the main skeleton of the polyalkyl (meth)acrylate rubber component has repeating units of n-butyl acrylate.

4. An impact-resistant resin composition according to claim 1, wherein the gel content of the compound rubber determined by extraction with toluene is higher than about 80 wt. %.

5. An impact-resistant resin composition according to claim 1, wherein the vinyl monomer to be grafted onto the compound rubber is an ester of methacrylic acid.

6. An impact-resistant resin composition according to claim 1, wherein the vinyl monomers to be grafted onto the compound rubber are acrylonitrile and styrene.

7. An impact-resistant resin composition according to claim 1, wherein the vinyl polymer (B) is a polymer of styrene.

8. An impact-resistant resin composition according to claim 1, wherein the vinyl polymer (B) is a copolymer of acrylonitrile with styrene.

9. An impact-resistant resin composition according to claim 1, wherein the vinyl polymer (B) is a polymer of methyl methacrylate.

10. An impact-resistant resin composition according to claim 1, wherein the resin composition comprises 15 to 95 wt. % of the compound rubber type graft copolymer (A) and 5 to 85 wt. % of the vinyl polymer (B).

11. An impact-resistant resin composition according to claim 1, wherein said compound rubber comprises a polyorganosiloxane rubber component obtained by emulsion polymerization of an organosiloxane, a crosslinking agent, and a graftlinking agent, and a polyalkyl(meth)acrylate rubber component obtained by polymerizing a monomer mixture of an alkyl(meth)acrylate, a crosslinking agent and a graftlinking agent after having the polyorganosiloxane rubber component impregnated with the monomer mixture.

* * * * *